(12) United States Patent
Nolte et al.

(10) Patent No.: US 10,000,102 B2
(45) Date of Patent: Jun. 19, 2018

(54) TUNABLE COMPACT SPRING AID

(71) Applicant: GM GLOBAL TECHNOLOGY OPERATIONS LLC, Detroit, MI (US)

(72) Inventors: Jason J. Nolte, Wixom, MI (US); Leo D. Sanford, Farmington Hills, MI (US); Stephen M. Lambiris, Union Lake, MI (US); Thomas A. Brock, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 15/163,103

(22) Filed: May 24, 2016

(65) Prior Publication Data

US 2016/0368342 A1 Dec. 22, 2016

Related U.S. Application Data

(60) Provisional application No. 62/182,079, filed on Jun. 19, 2015.

(51) Int. Cl.
*B60G 11/54* (2006.01)

(52) U.S. Cl.
CPC .......... *B60G 11/54* (2013.01); *B60G 2202/12* (2013.01); *B60G 2202/14* (2013.01); *B60G 2206/73* (2013.01); *B60G 2800/162* (2013.01)

(58) Field of Classification Search
CPC ......... B60G 11/54; B60G 11/52; B60G 11/60; B60G 11/62; B60G 2202/14; B60G 2206/73
See application file for complete search history.

(56) References Cited

U.S. PATENT DOCUMENTS

| | | | | |
|---|---|---|---|---|
| 3,042,391 A | * | 7/1962 | Glaser | F16F 1/02 267/181 |
| 4,858,897 A | * | 8/1989 | Irifune | F16D 3/72 267/181 |
| 7,722,335 B2 | * | 5/2010 | Kim | F04B 35/045 248/638 |
| 7,793,922 B2 | * | 9/2010 | Hikosaka | B60G 7/04 267/136 |
| 9,764,612 B2 | * | 9/2017 | Al-Dahhan | B60G 11/22 |
| 2002/0109328 A1 | * | 8/2002 | Remmert | B60G 11/16 280/124.147 |
| 2009/0127759 A1 | * | 5/2009 | Dickson | F16F 1/373 267/195 |

(Continued)

FOREIGN PATENT DOCUMENTS

| | | | |
|---|---|---|---|
| DE | 3201795 A1 | 7/1983 | |
| GB | 424723 A * | 2/1935 | ............. B60G 11/54 |

*Primary Examiner* — James A English
(74) *Attorney, Agent, or Firm* — Quinn IP Law (57) ABSTRACT

A spring aid for a vehicle suspension includes a compliant tower attachable to elements undergoing suspension travel. The tower defines an axis of travel or center axis and includes a plurality of rings and a plurality of window frames connecting the rings. The rings are perpendicular to, and spaced along, the axis, and define a cylindrical cavity. The window frames define a plurality of windows between the rings. The suspension element may also include a core, which substantially fills the cylindrical cavity of the compliant tower. A rod may be disposed within the core and movable within the hole of the shelf.

12 Claims, 5 Drawing Sheets

(56) References Cited

U.S. PATENT DOCUMENTS

| | | | |
|---|---|---|---|
| 2010/0213656 A1* | 8/2010 | Patil | B60G 11/54 |
| | | | 267/220 |
| 2013/0119593 A1* | 5/2013 | Konno | F16F 1/376 |
| | | | 267/293 |
| 2014/0252707 A1 | 9/2014 | Fleniken et al. | |
| 2015/0226280 A1* | 8/2015 | Chen | F16F 1/40 |
| | | | 267/294 |
| 2016/0245362 A1* | 8/2016 | Szostek | F16F 9/366 |

* cited by examiner

TUNABLE COMPACT SPRING AID

CROSS-REFERENCE TO RELATED APPLICATIONS

This application claims the benefit of U.S. Provisional Application No. 62/182,079, filed Jun. 19, 2015, which is hereby incorporated by reference in its entirety.

TECHNICAL FIELD

This disclosure generally relates to suspension elements for vehicles or other equipment.

BACKGROUND

Suspension systems—such as those for vehicles, manufacturing equipment, or buildings—link a frame or body (sprung elements) to wheels or the ground (unsprung elements). The suspension systems allow controlled movement between the sprung and the unsprung elements.

SUMMARY

A highly tunable, configurable, and compact suspension element for a vehicle is provided. The suspension element, which may be referred to as a spring aid, includes a compliant tower attachable to elements undergoing suspension travel. The tower defines an axis of travel or center axis and includes a plurality of rings and a plurality of window frames connecting the rings.

The plurality of rings are oriented perpendicular to the axis and are spaced along the axis by the plurality of window frames. The plurality of rings define a cylindrical cavity, and the plurality of window frames define a plurality of windows between the rings. The tower may be formed integrally as one piece.

The suspension element may also include a core, which substantially fills the cylindrical cavity of the compliant tower. At least one rod may be disposed within the core. The rod may be movable within the hole of the shelf The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
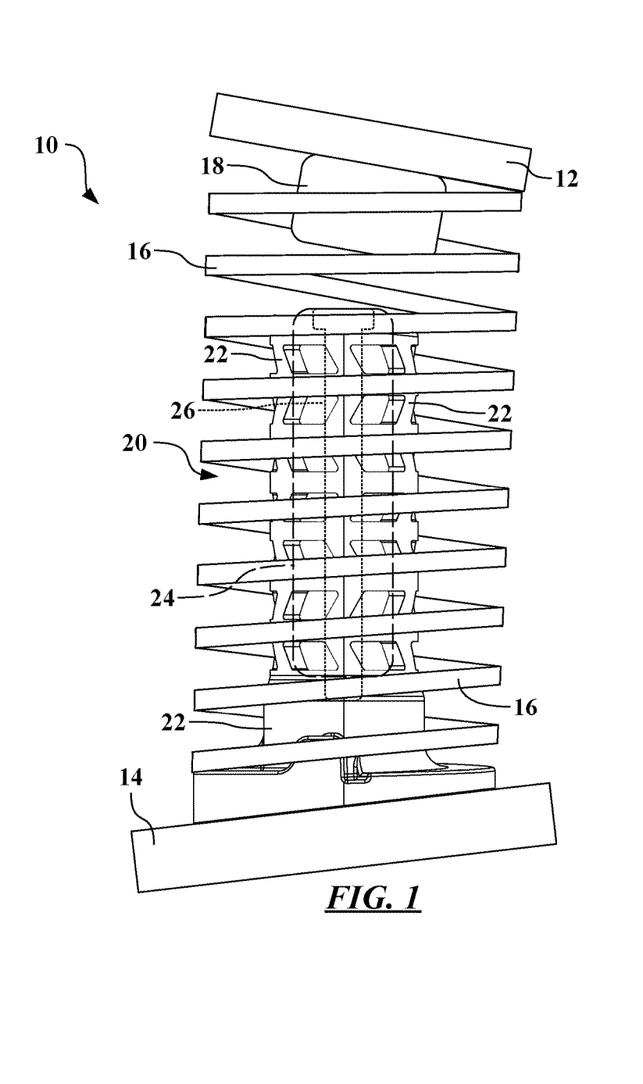
FIG. 1 is a schematic, side view of a suspension system having a spring aid, shown in an unactuated or uncompressed state.

Referring to the drawings, wherein like reference numbers correspond to like or similar components whenever possible throughout the several figures, there is shown in FIG. 1 a portion of a vehicle (not numbered). In particular, FIG. 1 shows a portion of a suspension system 10 for the vehicle. A sprung member, such as a frame member 12, is schematically shown in FIG. 1 and broadly illustrates the structural chassis elements. The frame member 12 may be, for example and without limitation, body-on-frame or body-frame-integral components that are suspended (sprung) by the suspension system 10.

A suspension member 14 is schematically shown in FIG. 1 and broadly illustrates a suspension component joining the frame member 12 to the unsprung elements of the vehicle. The suspension member 14 may be, for example and without limitation: an A-arm, a control arm, a trailing arm, or a leaf spring. Furthermore, the suspension member 14 may be one of the unsprung components, such as, for example and without limitation: a knuckle or a drive axle.

A coil spring 16 resides between the frame member 12 and the suspension member 14. Therefore, the coil spring 16 reacts to, likely in concert with other suspension components, relative movement between the frame member 12 and the suspension member 14. Note that the illustrated positions of the frame member 12 and the suspension member 14 are not limiting and are generally interchangeable. These elements simply represent components moveable relative to one another with the coil spring 16 disposed therebetween.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

A striker or bumper 18 may be attached to one of the frame member 12 and the suspension member 14, and a compliant spring aid 20 is attached to or rests on the other of the frame member 12 and the suspension member 14. In the configuration shown, the bumper 18 is attached to the frame member 12 and the compliant spring aid 20 resides on the suspension member 14.

Figure 2:
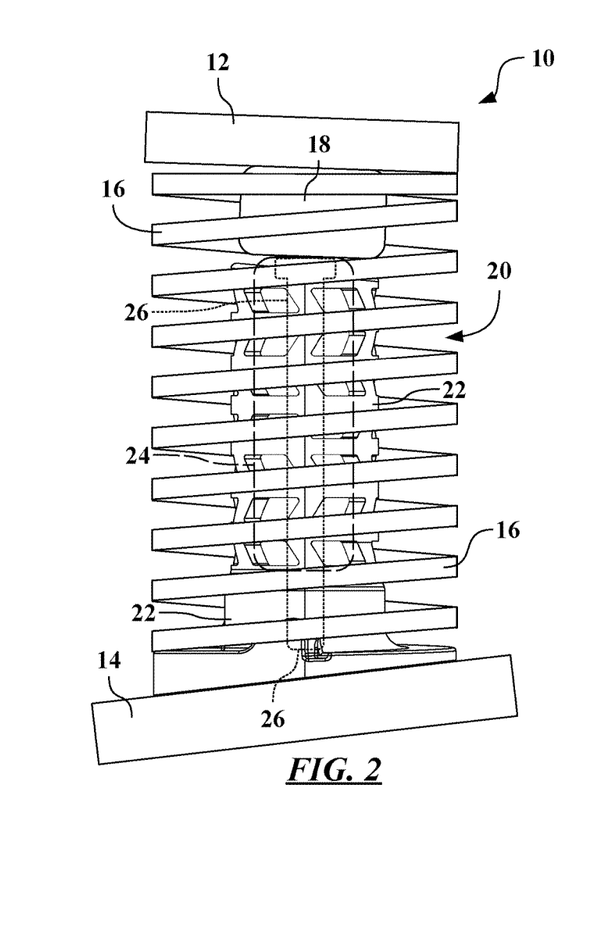
FIG. 2 is a schematic, side view of the suspension system of FIG. 1, shown in an actuated or compressed state.

Referring also to FIG. 2, and with continued reference to FIG. 1, there is shown another view of the suspension system 10. FIG. 1 shows the suspension system 10 in a relatively unloaded state, such that the spring aid 20 is not engaged with the bumper 18. FIG. 2 shows the suspension system 10 in a loaded state, as compared to FIG. 1, such that the frame member 12 has moved toward the suspension member 14, which causes the coil spring 16 to compress and the bumper 18 to engage with the spring aid 20. As illustrated in FIG. 2, the spring aid 20 compresses under sufficient loads as the suspension system 10 travels.

In the figures, the spring aid 20 is illustrated as being disposed entirely within the coil spring 16. This configuration may be beneficial for packaging reasons, as the spring aid 20 does not require any additional space and utilizes what may otherwise be empty space inside of the coil spring 16. However, in other configurations, the spring aid 20 may be located elsewhere—such as offset from, but adjacent to, the coil spring 16—while still having substantially the same effect on the suspension system 10.

The spring aid 20 has several primary components, including a tower 22, which is formed from a compliant material, including, without limitation: rubber or urethane. The tower 22 may therefore also be referred to as a compliant tower. A core 24 may fill a portion of the tower 22 and at least one rod 26 may be disposed within the core 24. The core 24 and the rod 26 are shown in phantom or dashed lines in FIGS. 1 and 2, and are illustrated elsewhere in the figures. Additional rods 26 may be included and would interact with the other components similarly. In some configurations, the tower 22 may include only the core 24. In some configurations, the tower 22 may not have either the core 24 or the rod 26.

Although only one suspension system 10 is illustrated in the figures, it is likely that a plurality of similar suspension systems 10 would be located on the vehicle. The size, strength, and damping of each location may vary, particularly with regard to suspension systems 10 associated with different axels of the vehicle, or they may be very similar.

In addition to vehicular applications, including trailers, the spring aid 20 may be usable with suspension systems for other applications. For example, and without limitation, heavy industrial, construction, and mining equipment may incorporate the spring aid 20 or other portions of the suspension system 10. Additionally, large industrial or manufacturing equipment may include suspension systems to cope with heavy items moving or heavy forces being applied relative to fixed foundations or floors. Furthermore, buildings may utilize suspension systems to account for environmental (wind, water) or geologic loads.

Figure 3:
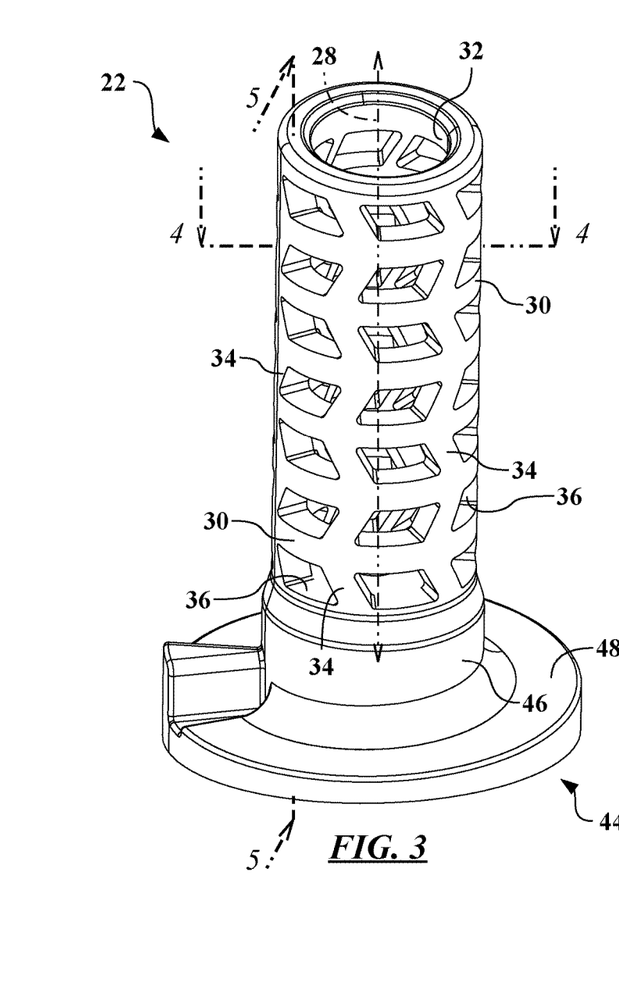
FIG. 3 is a schematic, isometric view of a tower of the spring aid shown in FIGS. 1 and 2.
Figure 4:
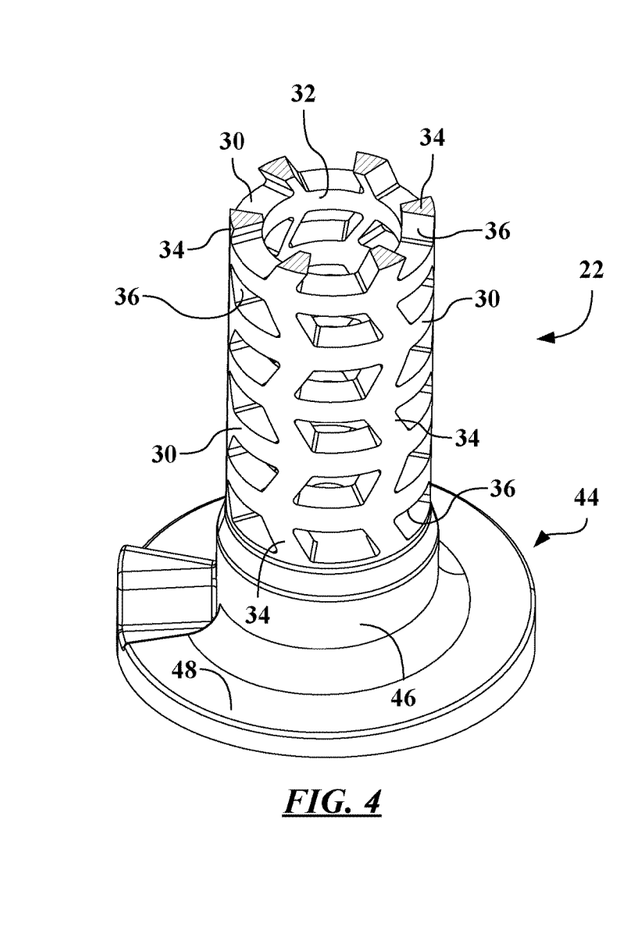
FIG. 4 is a schematic, cross-sectional view of the tower taken generally along a line 4-4 of FIG. 3, illustrating trapezoidal window frame elements between rings of the tower.

Referring now to FIG. 3 and to FIG. 4, and with continued reference to FIGS. 1-2, there are shown additional views of the tower 22 of the spring aid 20. To better illustrate features of the tower 22, the core 24 and the rod 26 are not shown in FIGS. 3 and 4. FIG. 3 shows an isometric or orthogonal view of the tower 22, and FIG. 4 shows a cross-sectional view of the tower 22 taken generally along a line 4-4 from FIG. 3.

The tower 22 defines an axis of travel, central axis, or axis 28. The axis 28 generally follows the compression and rebound path of the tower 22 or the spring aid 20, as a whole. In the configuration shown, the axis 28 is substantially linear. However, in other configurations, the tower 22 may be curved, possibly similar to the arc of the spring 16, such that the axis 28 resembles an arc.

The tower 22 includes a plurality of rings 30 that are substantially perpendicular to the axis 28, such that the radii of the rings 30 are substantially perpendicular to the axis 28 and an axis of each of the rings 30 is substantially parallel to the axis 28. The rings 30 are spaced along the axis 28 and define a cylindrical cavity 32. The core 24 is disposed within the cylindrical cavity 32.

A plurality of window frames 34 connect the rings 30 and define a plurality of windows 36 between the rings 30. The window frame 34 may also define the rings 30 or structures similar thereto. The rings 30 and window frames 34 collectively form an upper wall of the tower 22. The upper wall is generally a cylinder, with the axis 28 defined at the center thereof. As shown in the figures, all of the components of the tower 22 may be formed as a single, unitary, piece. Alternatively, the tower 22 may be formed from different pieces, and possibly different materials, which are subsequently attached or assembled together.

In other configurations, the window frames 34 may form the entire upper wall of the tower 22, without the rings 30. In such a configuration, the window frames 34 provide both the longitudinal reaction force, such as compression along the axis 28, and the lateral reaction force, such as from expansion of the core 24, for the tower 22.

As best viewed in FIG. 4, the window frames 34 may be angled relative to the rings 30 and have a trapezoidal cross-section. The trapezoidal shape of the window frames 34 may improve manufacturability, stability, and compliant force applied as the tower 22 is loaded and compressed. The window frames 34 may have alterative shapes, including, without limitation, circular or parallelogram cross sections.

The window frames 34 are oriented at an angle, as opposed to being directly perpendicular, relative to the rings 30. Therefore, the window frames 34 have a somewhat helical relationship to the axis 38. The angle introduces a moment between the ends of the window frames 34, such that they fall or move sideways in addition to compressing as the tower 22 is loaded. The angle of the window frames 34 creates a twisting tendency between adjacent rings 30. Therefore, the angle of the window frames 34 alternates or oscillates, such that alternating rings are subject to opposing twist force or torque as the spring aid 20 compresses and rebounds.

In the configuration shown, the window frames 34, and the windows 36 defined thereby, are all substantially identical. However, the spring aid 20 may also have window frames 34 of varied thickness. Varied window frames 34 allow the tower 22 to have different damping effects depending on the level of compression, such that the damping curve applied by the spring aid 20 may be tuned for specific applications. For instance, the upper layers may have thinner window frames 34, creating larger windows 36. Note that varied thickness of the window frames 34 may also alter the buckling resistance of portions of the tower 22, such that the tower 22 is likely to buckle in a specific location.

Figure 5:
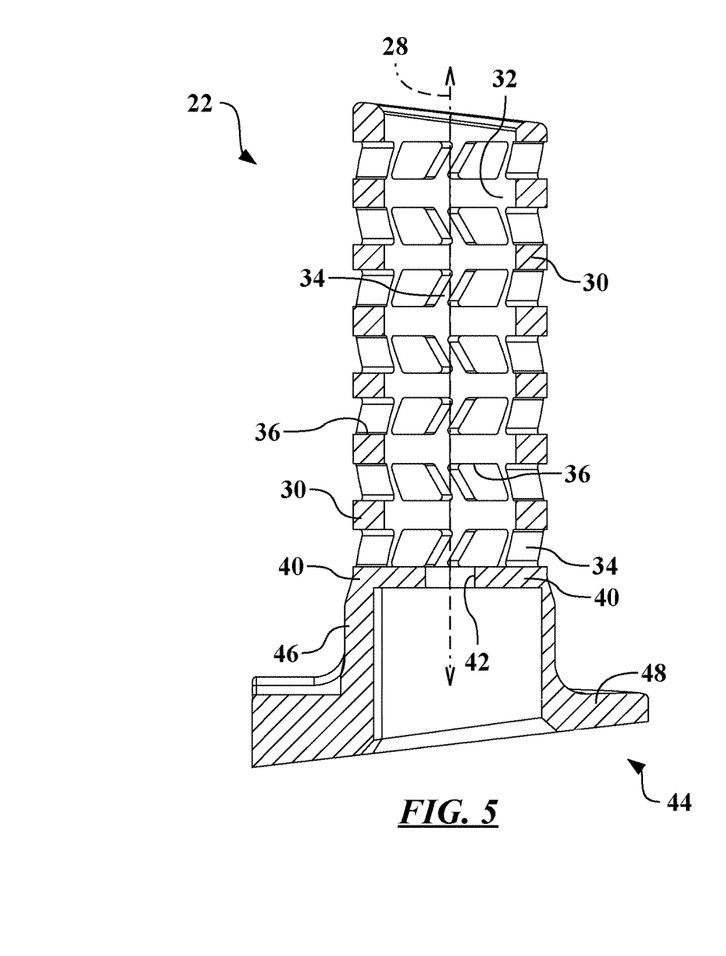
FIG. 5 is a schematic, cross-sectional view of the tower taken generally along a line 5-5 of FIG. 3, illustrating a cylindrical cavity within the tower.
Figure 6:
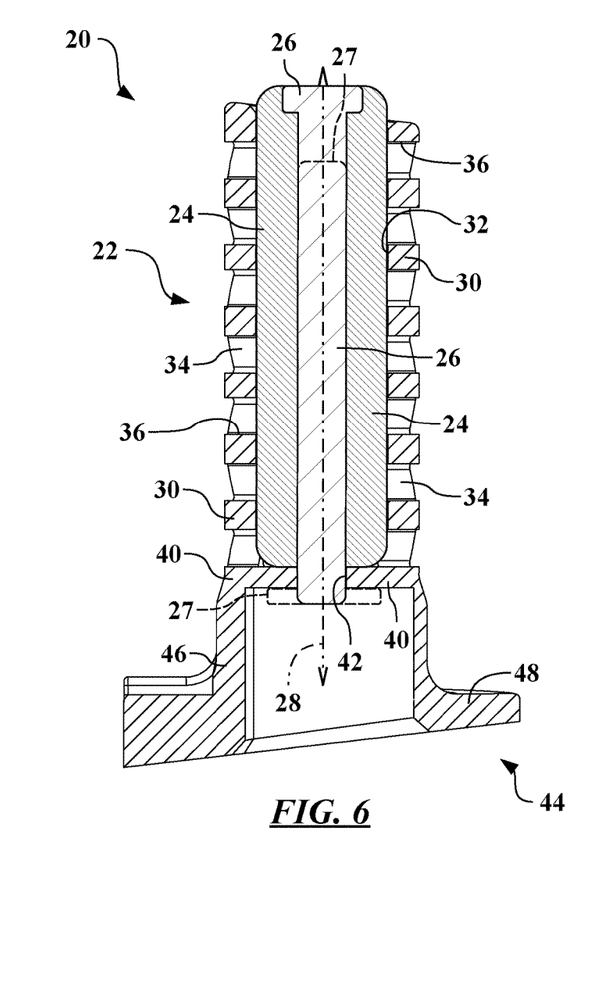
FIG. 6 is a schematic, cross-sectional view of the tower taken from the same viewpoint as FIG. 5, illustrating a core and rod disposed within the tower.

Referring now to FIG. 5 and to FIG. 6, and with continued reference to FIGS. 1-4, there are shown additional views of the spring aid 20. FIG. 5 shows a cross-sectional view of the tower 22 taken generally along a line 5-5 from FIG. 3. FIG. 6 shows a cross-sectional view of the tower 22 taken from the same viewpoint as the line 4-4 in FIG. 3. However, FIG. 6 includes the core 24 and the rod 26.

A shelf 40 may be substantially perpendicular to the axis 28. The shelf 40 defines a hole 42 that is aligned with, and may intersect, the axis 28.

A base 44 extends on the opposite side of the shelf 40 from the rings 30. The base 44 includes a lower wall 46 and a platform 48. In some configurations, the shelf 40 and the base 44 may be combined, such that the shelf 40 and the platform 48 form a common structure—possibly having the hole 42 defined therein—that would sit directly on either the suspension member 14 or the frame member 12.

As illustrated by FIGS. 5 and 6, the core 24 substantially fills the cylindrical cavity 32 of the tower 22. The rod 26 is disposed within the core 24 and is movable within the hole 42 of the shelf 40. Much of the spring aid 20, including the core 24, is formed from compliant materials, but the rod 26 may be formed from rigid materials, such steel, aluminum, or alloys thereof. The rod 26 may also be formed from compliant materials. As is apparent in FIG. 6, and illustrated by comparison of FIGS. 1 and 2, as the spring aid 20 compresses, the rod 26 may slide downward through the hole 42.

The core 24 may be formed from an elastic material, such as, without limitation: foam rubber or urethane. Therefore, the (relatively) rigid rod 26 sits within the foam core 24 like the center of a Twinkie. The rod 26 provides resistance to lateral—i.e., perpendicular to the axis 28—force or movement that may otherwise cause buckling or bowing of the tower 22. The core 24 reacts against any inward force of the upper wall of the tower 22 during buckling or bowing. The core 24 also holds and aligns the rod 26 relative to the tower 22 and provides compliant force as the spring aid 20 is compressed. In some configurations, the core 24 may extend upward beyond the rod 26, to promote relatively soft and quiet initial contact between the spring aid 20 and the bumper 18.

In the configuration shown, the core 24 compresses against the shelf 40. However, the core 24 may alternatively react against the base 48 of the tower 22 or directly against the structure upon which the spring aid 20 sits, such as the frame member 12 or the suspension member 14.

In other configurations, the orientation of the rod 26 may be reversed, as illustrated in phantom by a flipped rod 27 in FIG. 6, which is upside down relative to the rod 26 shown in the remainder of the figures. The flipped rod 27 allows a large portion of the core 24 to make contact with the bumper 18, which promotes quiet contact between the bumper 18 and the spring aid 20. The flipped rod 27 may also allow the rod 26 to be formed from stronger materials. Additionally, where the flipped rod 27 has a flat head, as illustrated in FIG. 6, the head of the flipped rod 27 may sit below the shelf 40 and within the base 44. The rod 27 may also be stationary as the core 24 and tower 22 compress around the rod 27.

As illustrated in FIGS. 1, 2, 5, and 6, the base 44 is offset by an angle relative to the rings 30. In the configuration shown, the platform 48 is offset relative to the rings 30—and also to the axis 28. Alternatively, the lower wall 46 may be offset relative to the axis 28 of travel of the tower 22, such that the lower wall 46 and the upper wall of the tower 22 are at an angle. The angle between the base 44 and the rings 30 allows the tower 22, and the spring aid 20 to more closely match any arc of travel between the frame member 12 and the suspension member 14, whether the axis 28 is linear or itself arced.

Figure 7A:
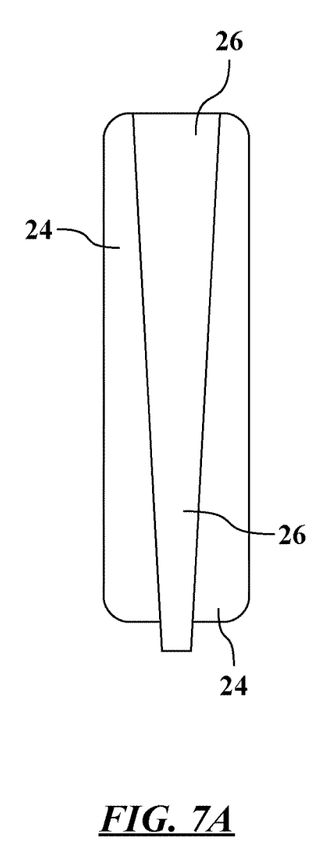
FIGS. 7A-7C are schematic illustrations of various examples of shapes of the rod and the core of the spring aid, with FIG. 7A showing the rod having a conical shape, FIG. 7B showing an hourglass shape, and FIG. 7C showing the rod having star-shaped cross section.
Figure 7B:
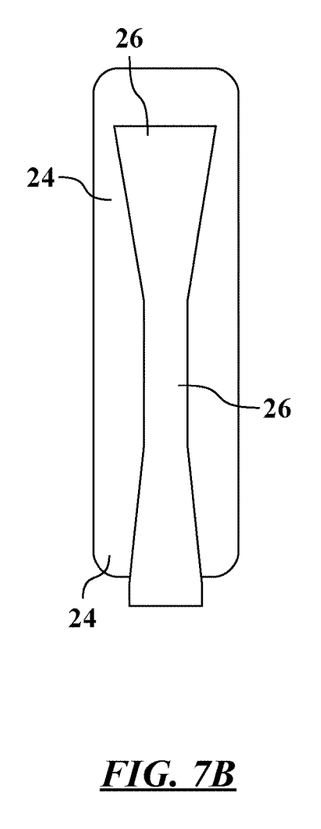
Figure 7C:
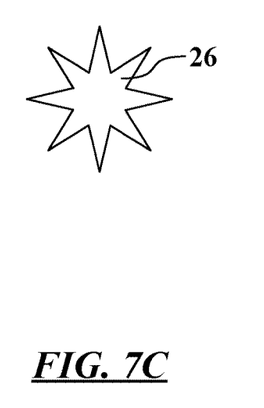

Referring now to FIGS. 7A-7B, and with continued reference to FIGS. 1-6, there are shown schematic illustrations of various shapes for the rod 26 and the core 24 of the spring aid 20. The configurations of the rod 26 shown vary the compliance of the spring aid 20 by varying the reaction between the rod 26 and the tower 22, in addition to varying the compliant properties of the core 24. In the configuration shown in FIGS. 1-6, the rod 26 has a substantially uniform cross section, such that the interaction between the rod 26 and the hole 42 is substantially the same at all points along the length of the rod 26.

The various configurations of the rod 26 also alter buckling or bowing resistance as the spring aid 20 is pressed or rebounds. The cross section of the rod 26 may also be designed to match the buckling force variation as the suspension system 10 travels through an arc or other path. The shape and size of the hole 42 through which the rod 26 moves may also affect the compliance force exerted by the spring aid 20. To further vary the damping properties of the spring aid 20, the core 24 may have variations in its density, may be formed from multiple materials, or both. Similarly, the rod 26 may be formed from multiple materials, have variations in density or strength, or both.

FIG. 7A shows the rod 26 having a conical shape. Therefore, as the conical rod 26 moves downward through the hole 42, it will progressively apply greater force to the shelf 40 and the hole 42. With the conical rod 26, the spring aid 20 will have increasing compliant reaction force as the compression and travel increase. Additionally, the conical rod 26 will progressively compress more of the core 24, which may also increase the reaction force of the spring aid 20 and increase resistance to buckling tendencies.

FIG. 7B shows the rod 26 having an hourglass shape. Therefore, as the rod 26 moves downward through the hole 42, it will initially apply deceasing force to the shelf 40 and the hole 42. Further travel will move the rod 26 into a center section applying constant force until a widening section at the top of the hourglass rod 26. Therefore, in addition to resisting buckling of the spring aid 20, the hourglass rod 26 provides variable reactive force as the spring aid 20 compresses.

FIG. 7C schematically illustrates an alternative cross-sectional shape of the rod 26. In addition to the generally round cross sections shown in the other figures, the rod 26 may have a more complex cross section, such as the star shape shown in FIG. 7C. The star rod 26 may reduce mass of relative to round sections, and acts as another tunable element in the design of the spring aid 20 to optimize compliance between the sprung and unsprung masses. Note that the hole 42 in the tower 22 may have a complementary shape, such as a matching star profile, or may have a different shape, such as the circle shown in the figures.

Figure 8A:
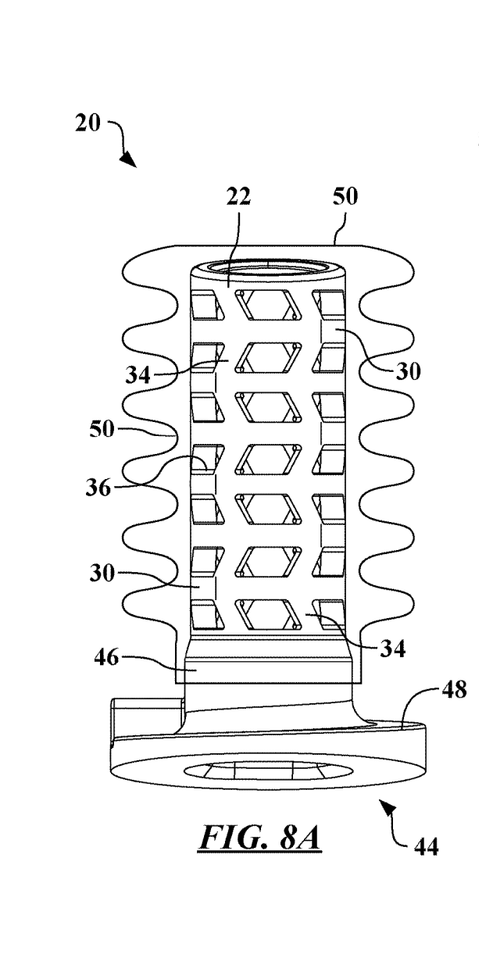
FIGS. 8A-8C are schematic illustrations of side views of the spring aid having various diagrammatic examples of sleeves surrounding the tower, with FIG. 8A showing a corrugated sleeve, FIG. 8B showing a telescoping sleeve, and FIG. 8C showing a smooth sleeve.
Figure 8B:
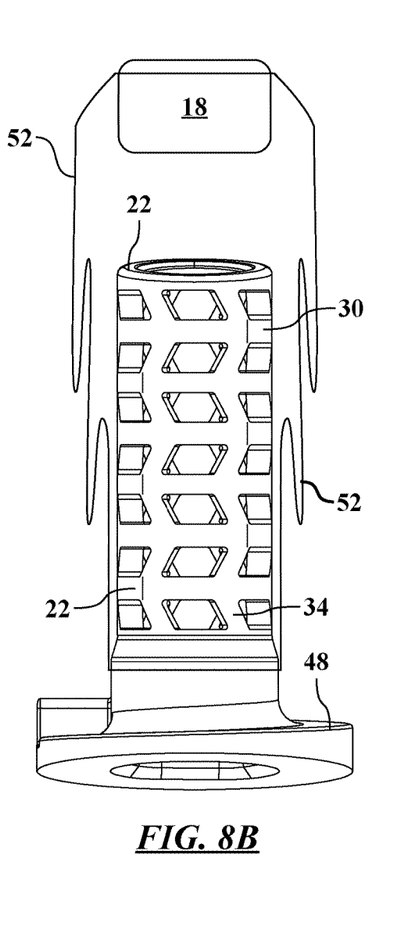
Figure 8C:
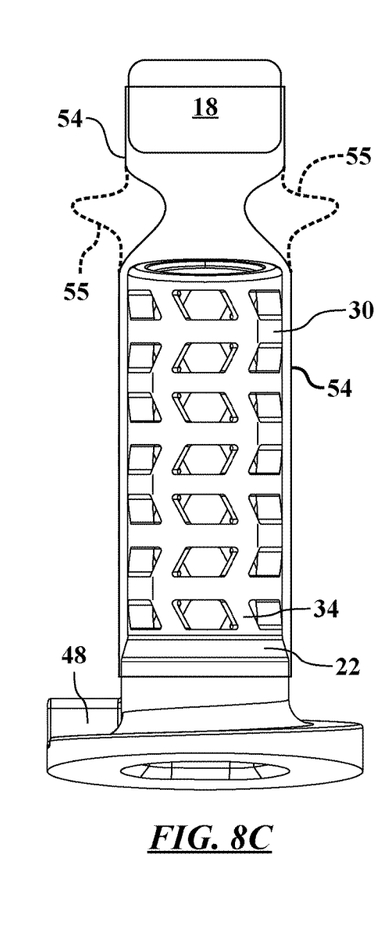

FIGS. 8A-8C are schematic illustrations of end or side views of the spring aid 20 having various configurations of sleeves surrounding the tower 22. These figures show only a two-dimensional diagrammatic representation of the outlines of illustrative sleeve locations. In general, a sleeve may be wrapped around the tower 22, and possibly the bumper 18, to prevent or minimize incursion of debris into the spring aid 20.

FIG. 8A shows a corrugated sleeve 50, which moves like an accordion as the tower 22 is compressed. The corrugated sleeve 50 is illustrated as covering only the tower 22 and any components, such as the core 24 and the rod 26, disposed therein. This configuration prevents debris from entering the windows 36 and from becoming lodged between the tower 22 and the core 24.

FIG. 8B shows a telescoping sleeve 52. As the tower 22 is compressed, the folds or overlapping portions of the telescoping sleeve 52 slide next to each other. The telescoping sleeve 52 is illustrated as spanning from the tower 22 to the bumper 18. This configuration may prevent debris from entering any portion of the tower 22, and also from moving between the bumper 18 and the spring aid 20. The telescoping sleeve 52 may be one piece or may have multiple pieces that overlap and slide past one another.

FIG. 8C shows a smooth sleeve 54. As the tower 22 is compressed, interior air applies pressure to expand the folds of the sleeve 54. This causes the folds to move outward as the bumper 18 advances toward the tower 22, as shown by the compressed position 55 of the sleeve 54. This configuration prevents ingress of debris while minimizing the cross-sectional area of the sleeve 54 and limits likelihood of pinching the sleeve 54 between portions of the coil spring 16. Furthermore, as illustrated by the compressed position 55, the sleeve 54 moves away from contact areas between the bumper 18 and the rest of the spring aid 20. Spring strips or features may also be used to control the location of the sleeve 54 during compression, such that the sleeve 54 need not be sealed to maintain pressure the internal pressure that would otherwise move the sleeve 54 to the compressed position 55.

The detailed description and the drawings or figures are supportive and descriptive of the subject matter discussed herein. While some of the best modes and other embodiments for have been described in detail, various alternative designs, configurations, and embodiments exist.

The invention claimed is:

1. A suspension system, comprising:
   a frame member;
   a suspension member;
   a coil spring joining the frame member and the suspension member, such that the frame member is movable relative to the suspension member;
   a bumper attached to one of the frame member and the suspension member;
   a compliant tower attached to the other of the frame member and the suspension member, wherein the tower defines an axis of travel and includes:
      a plurality of rings perpendicular to the axis and spaced along the axis, wherein the rings collectively define a cylindrical cavity about the axis within the compliant tower; and
      a plurality of window frames connecting the rings, wherein the window frames define a plurality of windows between the rings;
   a compliant core substantially filling the cylindrical cavity of the compliant tower; and
   a rod disposed within the compliant core.

2. The suspension system of claim 1, wherein the compliant tower further includes:
   a shelf substantially perpendicular to the axis, wherein the shelf defines a hole aligned with the axis, wherein the rod is movable within the hole of the shelf.

3. The suspension system of claim 2, further comprising:
   a base extending on the opposite side of the shelf from the rings, wherein the base is offset by an angle relative to the rings.

4. The suspension system of claim 3, wherein the window frames have a trapezoidal cross section.

5. The suspension system of claim 1, wherein the window frames have a trapezoidal cross section.

6. The suspension element of claim 1, further comprising:
   a sleeve covering the bumper and windows of the tower.

7. A suspension element for a vehicle, comprising:
   a compliant tower configured for attachment to elements subject to suspension travel, wherein the tower defines an axis of travel and includes:
      a plurality of rings perpendicular to the axis and spaced along the axis, defining a cylindrical cavity;
      a plurality of window frames connecting the rings, wherein the plurality of window frames define a plurality of windows between the rings and the have a trapezoidal cross section; and
      a shelf substantially perpendicular to the axis, wherein the shelf defines a hole aligned with the axis;
   a core substantially filling the cylindrical cavity of the compliant tower; and
   a rod disposed within the core and movable within the hole of the shelf.

8. The suspension element of claim 7, wherein the rod has a uniform cross section.

9. The suspension element of claim 8, further comprising:
   a sleeve covering the bumper and the windows of the tower.

10. A suspension system, comprising:
    a frame member;
    a suspension member;
    a coil spring joining the frame member and the suspension member, such that the frame member is movable relative to the suspension member;
    a bumper attached to one of the frame member and the suspension member;
    a compliant tower attached to the other of the frame member and the suspension member, wherein the tower defines an axis of travel and includes a plurality of window frames that define a plurality of windows therebetween and collectively define a cylindrical cavity about the axis of travel of the compliant tower;
    a compliant core substantially filling the cylindrical cavity of the compliant tower; and
    a rigid rod disposed with the compliant core.

11. The suspension system of claim 10, wherein portions of the compliant core have different material densities.

12. The suspension system of claim 10, wherein portions of the compliant core are formed from different materials.

* * * * *